(12) United States Patent
 Zhu (10) Patent No.: US 10,728,297 B2
(45) Date of Patent: Jul. 28, 2020

(54) STREAMING MEDIA PLAY MODE DETERMINATION METHOD AND APPARATUS

(71) Applicant: Chengdu Changtian Information Technology Co., Ltd., Chengdu (CN)

(72) Inventor: Yongqiang Zhu, Chengdu (CN)

(73) Assignee: Chengdu Changtian Information Technology Co., Ltd., Chengdu (CN)

( * ) Notice: Subject to any disclaimer, the term of this patent is extended or adjusted under 35 U.S.C. 154(b) by 353 days.

(21) Appl. No.: 15/717,489

(22) Filed: Sep. 27, 2017

(65) Prior Publication Data

US 2018/0288121 A1    Oct. 4, 2018

(30) Foreign Application Priority Data

Mar. 30, 2017   (CN) .......................... 2017 1 0204610

(51) Int. Cl.
| | |
|---|---|
| *H04L 29/06* | (2006.01) |
| *H04L 29/08* | (2006.01) |
| *H04N 21/81* | (2011.01) |
| *H04N 21/434* | (2011.01) |

(52) U.S. Cl.
CPC .......... *H04L 65/4092* (2013.01); *H04L 65/80* (2013.01); *H04N 21/434* (2013.01); *H04N 21/81* (2013.01)

(58) Field of Classification Search
CPC ... H04L 65/4092; H04L 65/80; H04L 65/601; H04L 67/10; H04L 45/00; H04N 21/81; H04N 21/4363; H04N 21/434; G06F 9/45558; G06F 2009/45595
See application file for complete search history.

(56) References Cited

U.S. PATENT DOCUMENTS

| | | | | |
|---|---|---|---|---|
| 2011/0044174 A1* | 2/2011 | Szymanski | ........... | H04L 47/283 370/238 |
| 2011/0283015 A1* | 11/2011 | Melnyk | ................. | H04L 47/263 709/233 |
| 2013/0204927 A1* | 8/2013 | Kruglikov | ................. | G06F 9/54 709/203 |
| 2014/0112160 A1* | 4/2014 | Kamdar | ............... | H04W 72/02 370/252 |

(Continued)

*Primary Examiner* — Hitesh Patel
*Assistant Examiner* — Clifton Houston
(74) *Attorney, Agent, or Firm* — Erickson Kernell IP, LLC (57) ABSTRACT

Embodiments of the present invention provide a streaming media play mode determination method and apparatus. The method includes: acquiring a streaming media play status in a current play mode, where the current play mode corresponds to a set of parameters for reflecting software and hardware states corresponding to a current play environment; calculating a candidate play mode according to the current play mode, if the streaming media play status satisfies a preset condition; and judging whether the current play mode is the same as the candidate play mode, and determining a play mode for streaming media to be played according to a result of the judgment. The embodiments of the present application provide a mechanism for intelligently selecting the streaming media play mode, make it possible to intelligently calculate the matching degrees of various types of algorithms in the current environment, enabling a best play mode to be preferentially selected.

6 Claims, 5 Drawing Sheets

(56) References Cited

U.S. PATENT DOCUMENTS

| | | | | |
|---|---|---|---|---|
| 2014/0188956 | A1* | 7/2014 | Subba | G06F 9/453 |
| | | | | 707/829 |
| 2014/0236980 | A1* | 8/2014 | Peng | G06F 16/5854 |
| | | | | 707/758 |
| 2015/0215359 | A1* | 7/2015 | Bao | H04L 65/60 |
| | | | | 709/219 |
| 2015/0256476 | A1* | 9/2015 | Kurtzman | H04L 47/70 |
| | | | | 709/226 |
| 2015/0334471 | A1* | 11/2015 | Innes | H04L 65/80 |
| | | | | 725/116 |
| 2016/0140579 | A1* | 5/2016 | Jackson | G06F 16/285 |
| | | | | 705/7.29 |
| 2017/0223074 | A1* | 8/2017 | Degrange | G06F 13/1673 |
| 2017/0223081 | A1* | 8/2017 | Degrange | H04N 21/234 |
| 2017/0293451 | A1* | 10/2017 | Pan | G06F 9/50 |

* cited by examiner

STREAMING MEDIA PLAY MODE DETERMINATION METHOD AND APPARATUS

CROSS-REFERENCE TO RELATED APPLICATION

This application claims priority from Chinese patent application No. 201710204610.7 filed on Mar. 30, 2017, the contents of which are incorporated herein by this reference.

TECHNICAL FIELD

The present invention relates to the technical field of processing streaming media for desktop virtualization, and particularly to a streaming media play (playback) mode determination method and apparatus.

BACKGROUND ART

At present, many desktop virtualization protocols support only a single streaming media processing mode. Although some desktop virtualization protocols provide a variety of streaming media processing modes, lags or some other circumstances often occur in the current play mode due to the current play environment, during the playing of streaming media. This makes a user unable to obtain, in a real time manner, a best play mode supported by the current play environment, thereby lowering the experience of the user in a great extent, and also bringing great inconvenience to the user. Therefore, how to solve the above problems is an issue which needs to be addressed urgently at present.

DISCLOSURE OF THE INVENTION

Embodiments of the present invention provide a streaming media play mode determination method and apparatus, so as to alleviate the above problems.

In a first aspect, a streaming media play mode determination method is provided by embodiments of the present invention. The method includes: acquiring a streaming media play status in a current play mode, where the current play mode corresponds to a set of parameters for reflecting software and hardware states corresponding to a current play environment; calculating a candidate play mode according to the current play mode, if the streaming media play status satisfies a preset condition; and judging whether the current play mode is the same as the candidate play mode, and determining a play mode for streaming media to be played according to a result of the judgment.

In a second aspect, a streaming media play mode determination apparatus is provided by embodiments of the present invention. The apparatus including: a play status acquisition unit configured to acquire a streaming media play status in a current play mode, where the current play mode corresponds to a set of parameters for reflecting software and hardware states corresponding to a current play environment; a play mode acquisition unit configured to calculate a candidate play mode according to the current play mode, if the streaming media play status satisfies a preset condition; and a play mode comparison unit configured to judge whether the current play mode is the same as the candidate play mode, and determine a play mode for streaming media to be played according to a result of the judgment.

With the streaming media play mode determination method and apparatus provided by embodiments of the present invention as described above, the streaming media play status in the current play mode is acquired; it is determined whether the streaming media play status in the current play mode matches the preset condition, and if yes, the candidate play mode is calculated according to the current play mode; and the candidate play mode is compared with the current play mode, to judge whether the current play mode is the same as the candidate play mode. In this way, the best play mode supported by the current play environment can be obtained in a real time manner, during the playing of the streaming media. Moreover, a perfect model is established by the deep analysis of various streaming media redirection algorithms in cooperation with the actual software and hardware usage environment of the streaming media, making it possible to calculate the matching degrees of various types of streaming media processing algorithms in the current environment, and thus enabling the best play mode to be preferentially selected.

BRIEF DESCRIPTION OF DRAWINGS

For illustrating technical solutions of embodiments of the present invention more clearly, drawings required to be used in the embodiments will be introduced briefly below. It is to be understood that the following drawings are merely illustrative of some embodiments of the present invention, and therefore should not to be considered as limiting the scope of the present invention. It would be understood by those skilled in the art that other relevant drawings could also be obtained from these drawings without any inventive effort.

DETAILED DESCRIPTION OF EMBODIMENTS

In order to make the objects, technical solutions and advantages of the embodiments of the present invention more clear, the technical solutions of the embodiments of the present invention will be described below clearly and completely with reference to the drawings of the embodiments of the present invention. It is apparent that the embodiments to be described are some, but not all of the embodiments of the present invention. All the other embodiments, obtained by those skilled in the art in light of the embodiments of the present invention without inventive efforts, would fall within the scope of the present invention as claimed. Thus, the following detailed description of the embodiments of the present invention, as represented in the figures, is not intended to limit the scope of the present invention as claimed, but is merely representative of selected embodiments of the present invention. All the other embodiments obtained by those skilled in the art in light of the embodiments of the present invention without inventive efforts would fall within the scope of the present invention as claimed.

Figure 1:
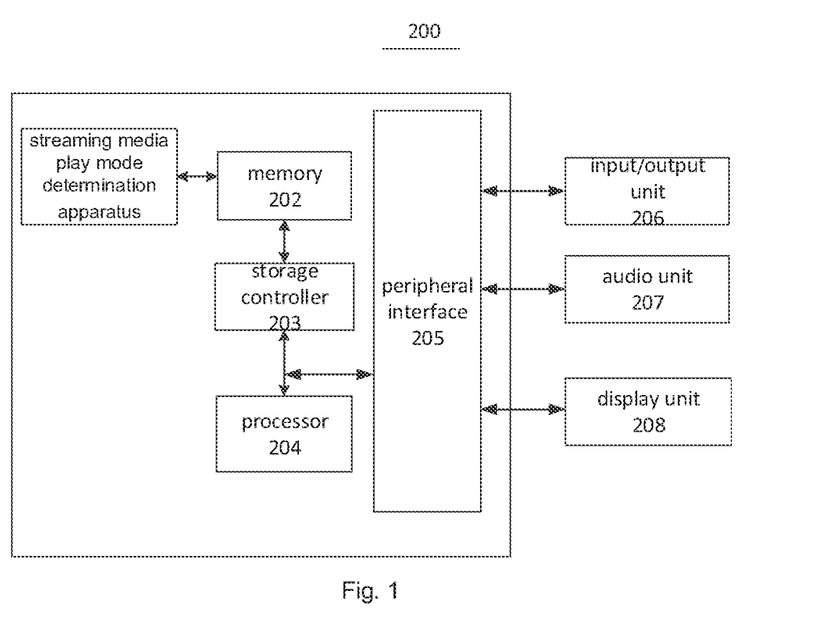
FIG. 1 is a structural block diagram of an electronic device provided according to an embodiment of the present invention.

In FIG. 1, a structural block diagram of an electronic device provided according to an embodiment of the present invention is shown. Specifically, the electronic device 200 includes a streaming media play mode determination apparatus, a memory 202, a storage controller 203, a processor 204, a peripheral interface 205, an input/output unit 206, an audio unit 207 and a display unit 208.

The respective elements, i.e., the memory 202, the storage controller 203, the processor 204, the peripheral interface 205, the input/output unit 206, the audio unit 207 and the display unit 208, are electrically connected with one another directly or indirectly, to achieve transmission or exchange of data. For example, the electrical connection between these elements may be achieved via one or more communication buses or signal lines. The streaming media play mode determination apparatus includes at least one software functional module which may be stored in the memory 202 or fixed in an operating system (OS) of a streaming media processing terminal device in the form of software or firmware. The processor 204 is configured to execute an executable module stored in the memory 202, such as a software functional module or a computer program included in the streaming media play mode determination apparatus.

Specifically, the memory 202 may be, but is not limited to, a random access memory (RAM), a read only memory (ROM), a programmable read-only memory (PROM), an erasable programmable read-only memory (EPROM), an electric erasable programmable read-only memory (EEPROM), or the like. The memory 202 is configured to store a program that is executed by the processor 204 once the processor receives an execution instruction.

The processor 204 may be an integrated circuit chip with signal processing capability. The processor 204 may be a general-purpose processor, including a central processing unit (CPU for short), a network processor (NP for short), or the like; and it may also be a digital signal processor (DSP), an application specific integrated circuit (ASIC), a field programmable gate array (FPGA) or any other programmable logic devices, a discrete gate or a transistor logic device, or an assembly of discrete hardware. The processor may be used to implement or execute various methods, steps and logical block diagrams disclosed in the embodiments of the present invention. The general-purpose processor may be a microprocessor, or the processor may also be any conventional processor 204 or the like.

The peripheral interface 205 couples various inputs/input apparatuses to the processor 204 and the memory 202. In some embodiments, the peripheral interface 205, the processor 204 and the storage controller 203 may be implemented in a single chip. In some other embodiments, they may be implemented by separate chips, respectively.

The input/output unit 206 is configured to provide data input by a user to achieve interaction between the user and a server or a local terminal. The input/output unit 206 may be, but is not limited to, a mouse, a keyboard and the like.

The audio unit 207 is configured to provide an audio interface to the user, and may include one or more microphones, one or more speakers and an audio circuit.

The display unit 208 provides an interaction interface (e.g., a user operation interface) between the server (or the local terminal) and the user, or is configured to display image data for user's reference. In the present embodiment, the display unit 208 may be a liquid crystal display or a touch display. If the display unit is a touch display, it may be a capacitive touch screen or a resistive touch screen or the like which supports single-touch and multi-touch operations. Supporting the single-touch and multi-touch operations means that the touch display is capable of sensing touch operations that occur simultaneously at one or more positions on the touch display and allowing the sensed touch operations to be calculated and processed by the processor 204.

Figure 2:
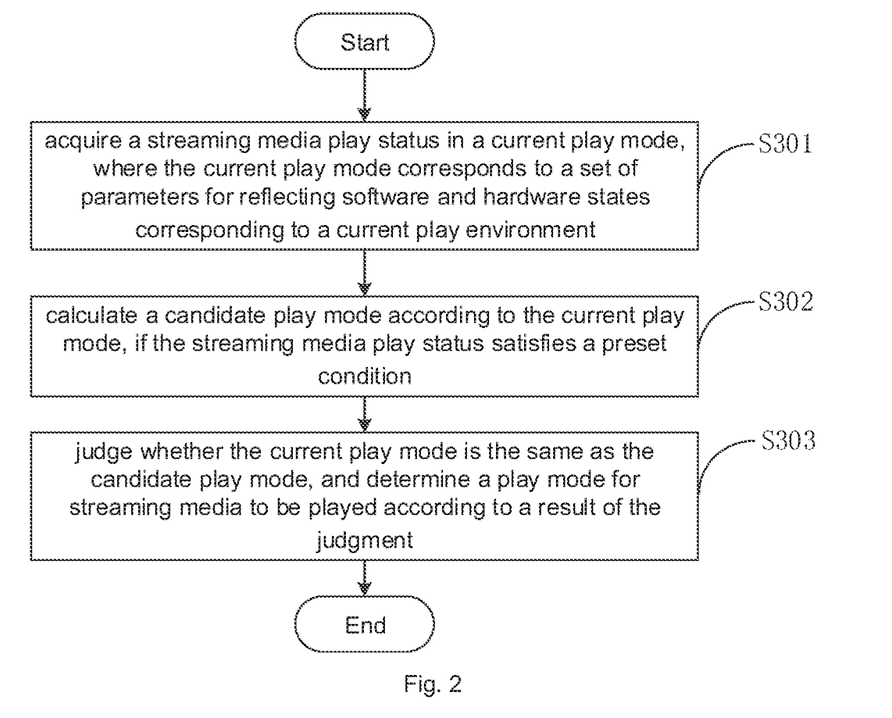
FIG. 2 is a flow chart of a streaming media play mode determination method provided according to a first embodiment of the present invention.

Referring to FIG. 2, a flow chart of a streaming media play mode determination method provided according to a first embodiment of the present invention is shown. The specific procedures shown in FIG. 2 will be described in detail below.

In step S301, a streaming media play status in a current play mode is acquired, where the current play mode corresponds to a set of parameters for reflecting software and hardware states corresponding to a current play environment.

In the present embodiment, before the streaming media play status in the current play mode is acquired, it is acquired whether there is streaming media being played currently. Monitoring of whether there is streaming media being played currently may be performed by monitoring an area for streaming media play detection, through trigger by identification of a streaming media area or through identification of player startup. Specifically, for example, the monitoring performed through trigger by identification of the streaming media area means that it is considered that there is streaming media being played currently once an area is identified as a streaming media area. The acquisition is specifically as follows. Firstly, a desktop drawing instruction is obtained at a server by a virtual graphic display card or a mirror display driver. Then, the type and parameters of the instruction are preliminarily judged, to judge whether the current instruction may be "streamed". If the current instruction may be "streamed", it is judged whether a time interval between adjacent two frames is time-out (a minimum time interval between two frames is allowed to be 0.2 s). If the time interval is time-out, the process ends; and if not, it is judged whether a current area coincides with an area on a previous instruction ring. If there is no coincidence therebetween, the process ends; and if there is coincidence therebetween, the progressivity of a current desktop image is judged by a sampling and comparison algorithm. Only if the progressivity is lower than a specified threshold, the image may be considered to be streaming media. If the image is identified as non-streaming media, the process ends; otherwise, the current area is judged as a streaming area if the cumulative number of the continuously acquired desktop images exceeds 20.

Specifically, the method of judging whether the current instruction may be "streamed" means: judging whether the instruction is a COPY operation; if it is judged that the instruction is a COPY operation, proceeding to judge whether a raster operation code is srccopy; and if the raster operation code is srccopy, judging that the current instruction may be streamed, and if not, ending the procedure.

As for the identification of the player startup, it means that a HOOK mode is adopted, that is, once it is found that a player is started up, it is considered that there is streaming media being played currently. Specifically, it is implemented as follows. Firstly, startup of a system process is monitored by a HOOK technology. Then, by comparing the name of the current started process with a list of player processes, it is judged whether the current process is a player process that needs to be monitored. Finally, if the current process is the process that needs to be monitored, the play area of the player may be determined by enumerating windows of the monitored process.

In the present embodiment, the streaming media play status refers to a status presented when the streaming media is played.

In the present embodiment, the set of parameters for reflecting software and hardware states corresponding to the current play environment refers to a first parameter for indicating whether server-side hardware acceleration is supported, a second parameter for indicating whether client-side hardware acceleration is supported, and a third parameter for indicating whether player redirection is supported.

The current play mode refers to a mode in which the streaming media is played at a current time point, and the play mode is a form presented by a play mode group. For example, in the case that the play mode group is a high-definition compatible mode group, the play mode presented when the streaming media is played may be a high-definition mode.

In step S302, a candidate play mode is calculated according to the current play mode, if the streaming media play status satisfies a preset condition.

In the present embodiment, the preset condition includes a condition that the streaming media play status corresponds to a lag and a Boolean value of any one reason parameter in a reason vector corresponding to the lag is 1, where the reason vector includes a plurality of reason parameters indicated by a Boolean expression. If all the reasons in the reason vector are not triggered, that is, when Boolean values of all the reason parameters in the reason vector are 0, the preset condition is not satisfied even if a lag occurs in the playing of the streaming media. This is because it is difficult to make quantitative statistic of client-side/server-side CPU consumption resulted from the playing of the streaming media.

In the present embodiment, it is determined whether a lag occurs in the playing of the streaming media by means of judgment based on the client-side frame rate. For example, if the play frame rate of the client-side streaming media play area is lower than a detection threshold (e.g., a threshold of 12 frames/second), it is considered that a lag occurs in the playing of the streaming media. The streaming media play status in the current play mode is acquired by acquiring the occurrence of a lag in the playing.

In the present embodiment, reasons for the occurrence of a lag include insufficient server-side coding capability, insufficient client-side decoding capability and insufficient bandwidth. Each of the reasons corresponds to a corresponding reason parameter, for example, a reason parameter corresponding to the insufficient server-side coding capability is a server-side CPU consumption ratio. Therefore, the reason corresponding to a reason parameter is acquired by acquiring the value of the reason parameter, that is, the reason for the occurrence of the lag is acquired. Table 1 shows specific reasons for the occurrence of the lag and methods for detecting the related reasons.

TABLE 1

| Reason Item | Related Parameter | Acquisition Method | Judgment Rule | Reason Vector Position |
|---|---|---|---|---|
| insufficient Server-side coding capability | Server-side CPU consumption ratio | Reading the CPU consumption ratio of one or more CPU cores of the server, and dividing the ratio by the number of the cores | The server-side CPU consumption ratio reaches 80% (a settable threshold) or more | the second position |
| insufficient Client-side decoding capability | Client-side CPU consumption ratio | Reading the CPU consumption ratio of one or more CPU cores of the client, and dividing the ratio by the number of the cores | The client-side CPU consumption ratio reaches 80% (a settable threshold) or more | the third position |
| Insufficient bandwidth | Bandwidth supported by the network | The server reads the bandwidth via a network adapter | The average bandwidth consumption accounts for 80% (a settable threshold) or more of the total bandwidth supported by the network | the fourth position |
| | Average bandwidth | The server makes statistics of the number of packages, and calculates an average bandwidth in a real time manner | | |
| | Peak bandwidth | The server makes statistics of and calculates bandwidths within individual time periods, and updates the maximum value at any time | | |
| | Average Bandwidth occupied by streaming media | The server makes statistics of and calculates an average bandwidth consumed for transmission of the streaming media | | |

In the present embodiment, the value of each reason parameter in the reason vector is represented by a Boolean expression. For example, the value in the reason vector is set to be 1 if the corresponding reason item occurs, otherwise, the value is set to be 0.

In the present embodiment, the reason vector further includes one integer for representing a play mode group number, and the integer representing the play mode group number is set at the first position of the reason vector. For example, as for a current reason vector Y (2, 1, 1, 0), this reason vector indicates that the current play mode group is a second type of play mode group, and the reason for occurrence of a lag in the playing is that the reason item of server-side coding and the reason item of client-side decoding are triggered, that is, the reason for the occurrence of the lag is the insufficient server-side coding capability and the insufficient client-side decoding capability. Specifically, it is reflected by the server-side CPU consumption ratio exceeding a preset threshold and the client-side CPU consumption ratio exceeding a preset threshold. In particular, the preset threshold may be 80%, or may also be any other numerical value. Here, it is not particularly defined.

In the present embodiment, the calculating the candidate play mode may be performed by: searching for, according to the current play mode, a ranking parameter set corresponding to the current play mode in a preset dynamic decision table, where the ranking parameter set includes a first ranking parameter for representing server-side CPU consumption, a second ranking parameter for representing client-side CPU consumption, and a third ranking parameter for representing network bandwidth consumption; and performing a calculation using each of the parameters in the ranking parameter set corresponding to the current play mode, and a corresponding parameter in each of ranking parameter sets corresponding to other play modes in the preset dynamic decision table other than the current play mode, to acquire the candidate play mode.

Specifically, in the preset dynamic decision table, play mode group numbers, play mode groups, play mode codes, mode requirement codes, server-side CPU consumption rankings, client-side CPU consumption rankings and network bandwidth consumption rankings are stored therein. One play mode group corresponds to one or more play mode codes, and the play mode codes have a one-to-one correspondence to the mode requirement codes. The play mode code indicates a play environment corresponding to the current play mode.

It is to be noted that, in the present embodiment, the play mode group refers to a mode used to play the streaming media, that is, the play mode is a form presented by the play mode group.

The mode requirement code is used to indicate the software and hardware states of the current play mode, that is, the mode requirement code is a parameter value indicating the software and hardware states of the current play mode. For example, '1' in the mode requirement code indicates that "this item is required", and '0' indicates that "this item is not required". Specifically, for example, (1, 0, 0) in a high-definition compatible mode group indicates that the server-side hardware acceleration is required and both the client-side hardware acceleration and the support for player redirection are not required during the playing with the high-definition compatible mode group. The details are shown in Table 2.

TABLE 2

| Play mode Group Number | Play mode Group | Play mode Code | Mode Requirement Code | Server-side CPU Consumption Ranking | Client-side CPU Consumption Ranking | Network Bandwidth Consumption Ranking |
|---|---|---|---|---|---|---|
| 1 | High-definition compatible mode group | (1, 1, 0, 0) | (1, 0, 0) | A1 | B1 | C1 |
|  |  | (1, 1, 1, 0) | (1, 1, 0) | A2 | B2 | C2 |
| 2 | Smooth compatible mode group | (2, 0, 0, 0) | (0, 0, 0) | A3 | B3 | C3 |
|  |  | (2, 1, 0, 0) | (1, 0, 0) | A4 | B4 | C4 |
|  |  | (2, 0, 1, 0) | (0, 1, 0) | A5 | B5 | C5 |
|  |  | (2, 1, 1, 0) | (1, 1, 0) | A6 | B6 | C6 |
| 3 | Simplified compatible mode group | (3, 0, 0, 0) | (0, 0, 0) | A7 | B7 | C7 |
| 4 | Seamless experience mode group | (4, 0, 1, 1) | (0, 1, 1) | A8 | B8 | C8 |
|  |  | (4, 1, 1, 1) | (1, 1, 1) | A9 | B9 | C9 |

In the present embodiment, the dynamic decision table is acquired on the basis of a universal mode set table and restrictive conditions. Specifically, the restrictive condition refers to a necessary condition or a recommended condition corresponding to each play mode group, and the necessary condition or the recommended condition refers to the requirements of the play environment on the server, the client and the player. Table 3 shows the restrictive conditions corresponding to each mode.

TABLE 3

| Play mode Group | Restrictive Conditions |
|---|---|
| Seamless experience mode group | 1. The client is provided with hard decoding (recommended). 2. There is a limitation for the player (necessary). |
| High-definition compatible mode group | 1. The server is provided with hard coding (necessary). 2. The client is provided with hard decoding (recommended). |
| Smooth compatible mode group | 1. The server is provided with hard coding (recommended). 2. The client is provided with hard decoding (recommended). |
| Simplified compatible mode group | None |

The necessary restrictive conditions refer to options that must be satisfied by the current environment if this play mode group is to be used, and if the current environment fails to satisfy these conditions, some function would be caused not to work properly or a storm in the use of hardware would be resulted. Similarly, the recommended restrictive conditions refer to options that it is best for the current environment to satisfy if this play mode group is to be used, and if the current environment fails to satisfy these conditions, some function would be probably available, which would influences the sufficiency of resources of the entire system.

Specifically, the universal mode set table is acquired on the basis of parameters indicative of the software and hardware states corresponding to the play mode groups, and Table 4 shows a universal set table for all the play modes.

TABLE 4

| Play mode Group Number | Play mode Group | Server-side Hardware Acceleration | Client-side Hardware Acceleration | Support for Player Redirection | Mode Requirement Code |
|---|---|---|---|---|---|
| 1 | High-definition compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |
| 2 | Smooth compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |
| 3 | Simplified compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |
| 4 | Seamless experience mode group | No | No | Yes | (0, 0, 1) |
|  |  | Yes | No | Yes | (1, 0, 1) |
|  |  | No | Yes | Yes | (0, 1, 1) |
|  |  | Yes | Yes | Yes | (1, 1, 1) |

Specifically, '1' in the mode requirement code indicates that "this item is required", and '0' indicates that "this item is not required". For example, (0, 0, 0) in the high-definition compatible mode group indicates that none of the server-side hardware acceleration, the client-side hardware acceleration and the support for player redirection is required by the play mode when the high-definition compatible mode group is used to play.

In the present embodiment, since the support for the player is only related to client-side rendering, the support for the player is not taken into consideration in the server-side rendering, that is, it is indicated as item in the universal mode set table.

Hardware mergence is performed on each play mode group in the universal mode set table. For example, if a certain play mode group does not support hardware acceleration, it is considered that this play mode group is independent of hardware, four mode requirement codes of this play mode group which correspond to the hardware acceleration are merged, and the first two positions of the mode requirement codes are unified to be 0. Table 5 shows an intermediate table after mergence.

TABLE 5

| Play mode Group Number | Play mode Group | Server-side Hardware Acceleration | Client-side Hardware Acceleration | Support for Player Redirection | Mode Requirement Code |
|---|---|---|---|---|---|
| 1 | High-definition compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |

TABLE 5-continued

| Play mode Group Number | Play mode Group | Server-side Hardware Acceleration | Client-side Hardware Acceleration | Support for Player Redirection | Mode Requirement Code |
|---|---|---|---|---|---|
| 2 | Smooth compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |
| 3 | Simplified compatible mode group | — | — | — | (0, 0, 0) |
| 4 | Seamless experience mode group | No | No | Yes | (0, 0, 1) |
|  |  | Yes | No | Yes | (1, 0, 1) |
|  |  | No | Yes | Yes | (0, 1, 1) |
|  |  | Yes | Yes | Yes | (1, 1, 1) |

The hardware mergence on each play mode group in the universal mode set table means screening out a hardware support state corresponding to each play mode group, according to the hardware support state preset for the play mode group. For example, the simplified compatible mode group does not support the hardware acceleration, then the mode requirement code of the simplified compatible mode group is (0,0,0) after the mergence of the universal mode set table.

Moreover, the data in the intermediate table is filtered according to the restrictive conditions, to obtain a filtered intermediate table. For example, the filtering is performed on the basis of a broad restrictive condition, and the filtered intermediate table is specifically shown in Table 6.

TABLE 6

| Play mode Group Number | Play mode Group | Server-side Hardware Acceleration | Client-side Hardware Acceleration | Support for Player Redirection | Mode Requirement Code |
|---|---|---|---|---|---|
| 1 | High-definition compatible mode group | Yes | No | — | (1, 0, 0) |
|  |  | Yes | Yes | — | (1, 1, 0) |
| 2 | Smooth compatible mode group | No | No | — | (0, 0, 0) |
|  |  | Yes | No | — | (1, 0, 0) |
|  |  | No | Yes | — | (0, 1, 0) |
|  |  | Yes | Yes | — | (1, 1, 0) |
| 3 | Simplified compatible mode group | — | — | — | (0, 0, 0) |
| 4 | Seamless experience mode group | No | Yes | Yes | (0, 1, 1) |
|  |  | Yes | Yes | Yes | (1, 1, 1) |

The broad restrictive condition refers to a recommended condition corresponding to each play mode group. Specifically, the recommended condition means that the play environment may have requirements on the server, the client and the player, but the requirements may also be unnecessary. The details are shown in Table 3.

The dynamic decision table is generated by filtering the intermediate table on the basis of the restrictive condition. Moreover, the server-side CPU consumption ranking, the client-side CPU consumption ranking and the network bandwidth consumption ranking are added to the dynamic decision table.

In the present embodiment, the play mode code is generated based on the mode requirement code and the play mode group number. That is, the play mode code is constituted in a form of the play mode group number+the mode requirement code. For example, if the play mode group number is 2 and the mode requirement code is (1,0,0), the play mode code is (2,1,0,0).

In the present embodiment, each of the parameters in the ranking parameter set corresponding to the play mode code corresponding to the current play mode is subtracted from a corresponding parameter in each of ranking parameter sets corresponding to play mode codes corresponding to other play modes in the preset dynamic decision table other than the current play mode, to obtain a declining intersection corresponding to each of the other play mode codes, the declining intersection including a first result, a second result and a third result. For example, the play mode code corresponding to the current play mode belongs to the simplified compatible mode group and the ranking parameter set of the play mode code is P3=(A7, B7, C7), and the individual play mode codes in the high-definition compatible mode group correspond to ranking parameter sets of P11=(A1, B1, C1) and P12=(A2, B2, C2), then A7 in P3 is subtracted from A1 in P11 and A2 in P12, so as to obtain the first result A1-A7 in a declining intersection corresponding to P11; similarly, the second result in the declining intersection corresponding to P11 is B1-67, and the third result in the declining intersection corresponding to P11 is C1-C7. As a result, the declining intersection corresponding to P11 is PX (A1-A7, B1-67, C1-C7).

For example, the ranking parameter sets for the current individual play mode groups are shown in Table 7.

TABLE 7

| Play mode Group Number | Play mode Group | Play mode Code | Mode Requirement Code | Server-side CPU Consumption Ranking | Client-side CPU Consumption Ranking | Network Bandwidth Consumption Ranking |
|---|---|---|---|---|---|---|
| 1 | High-definition compatible mode group | (1, 1, 0, 0) | (1, 0, 0) | 4 | 2 | 6 |
| | | (1, 1, 1, 0) | (1, 1, 0) | 4 | 6 | 6 |
| 2 | Smooth compatible mode group | (2, 0, 0, 0) | (0, 0, 0) | 1 | 3 | 2 |
| | | (2, 1, 0, 0) | (1, 0, 0) | 4 | 3 | 2 |
| | | (2, 0, 1, 0) | (0, 1, 0) | 1 | 6 | 2 |
| | | (2, 1, 1, 0) | (1, 1, 0) | 4 | 6 | 2 |
| 3 | Simplified compatible mode group | (3, 0, 0, 0) | (0, 0, 0) | 3 | 5 | 1 |
| 4 | Seamless experience mode group | (4, 0, 1, 1) | (0, 1, 1) | 8 | 1 | 8 |
| | | (4, 1, 1, 1) | (1, 1, 1) | 8 | 6 | 8 |

In the case that the play mode code corresponding to the current play mode belongs to the simplified compatible mode group, the declining intersections corresponding to the play mode codes corresponding to the other play modes other than the simplified compatible mode group are shown in Table 8.

TABLE 8

| Play mode Group Number | Play mode Group | Play mode Code | Mode Requirement Code | Declining Intersection First result | Second result | Third result | Whether all the results are positive |
|---|---|---|---|---|---|---|---|
| 1 | High-definition compatible mode group | (1, 1, 0, 0) | (1, 0, 0) | 1 | −3 | 5 | No |
| | | (1, 1, 1, 0) | (1, 1, 0) | 1 | 1 | 5 | Yes |
| 2 | Smooth compatible mode group | (2, 0, 0, 0) | (0, 0, 0) | −2 | −2 | 1 | No |
| | | (2, 1, 0, 0) | (1, 0, 0) | 1 | −2 | 1 | No |
| | | (2, 0, 1, 0) | (0, 1, 0) | −2 | 1 | 1 | No |
| | | (2, 1, 1, 0) | (1, 1, 0) | 1 | 1 | 1 | Yes |
| 3 | Simplified compatible mode group | (3, 0, 0, 0) | (0, 0, 0) | — | — | — | — |
| 4 | Seamless experience mode group | (4, 0, 1, 1) | (0, 1, 1) | 5 | −4 | 7 | No |
| | | (4, 1, 1, 1) | (1, 1, 1) | 5 | 1 | 7 | Yes |

A corresponding reason vector when a lag occurs in the current play mode is acquired, that is, the reason vector corresponding to the play mode code corresponding to the current play mode is acquired. The reason vector includes one integer for representing the play mode group number and a plurality of reason parameters indicated by a Boolean expression. The reason parameters include a first reason parameter for indicating whether the server-side coding capability is sufficient, a second reason parameter for indicating whether the client-side decoding capability is sufficient, and a third reason parameter for indicating whether the bandwidth is sufficient. For example, in the case that the current play mode belongs to the simplified compatible mode group and the reason vector is (2,1,0,0), the first reason parameter corresponds to a value of 1, the second reason parameter corresponds to a value of 0, and the third reason parameter corresponds to a value of 0.

Each of the reason parameters in the reason vector is compared with a one corresponding result of the individual results in the declining intersection, to search for all first declining intersections from the declining intersections. For example, if the current play mode belongs to the simplified compatible mode group and the corresponding reason vector is (3, 0, 0, 1), the first reason parameter corresponds to a value of 0, the second reason parameter corresponds to a value of 0, and the third reason parameter corresponds to a value of 1. The value corresponding to the first reason parameter is matched with each of the values of the first results of all the declining intersections, that is, declining intersections with the first result being positive are acquired base on the value of the first reason parameter of 1; similarly, declining intersections with the first result being non-negative are acquired if the value of the first reason parameter is 0; and likewise, the second result and the third result may be obtained in a matching process similar to that for the first result. According to the above matching process, declining intersections of (1,1,1), (1,1,5) and (5,1,7) may be obtained on the basis of the data in Table 8, the play mode codes corresponding to these declining intersections are (2,1,1,0), (1,1,1,0) and (4,1,1,1). Since these declining intersections are more than one in number, the candidate play mode may be obtained by applying a preset algorithm based on total superiority rate to a mode set corresponding to these declining intersections, which will be described in detail below.

In the present embodiment, if the first declining intersection is searched out and a play mode code set corresponding to the first declining intersection contains a play mode code which belongs to a same play mode group as the play mode code corresponding to the current play mode, the current play mode is marked as the candidate play mode. For example, in the case that the current play mode belongs to the high-definition compatible mode group, and the current play mode code is (1,1,0,0), if the play mode code corresponding to the declining intersection with all values being non-negative is (1,1,1,0), the play mode code set corresponding to the declining intersection contains a play mode code which belongs to the same play mode group as the play mode code corresponding to the current play mode. Since the play mode code belongs to the high-definition compatible mode group, in this case, the high-definition compatible mode group is still taken as the optimal play mode in the current environment; and in this case, the mode requirement code corresponding to the current play mode is (1,0,0), indicating that the client-side hardware acceleration is not required in the current play mode, while the requirement code corresponding to the acquired play mode code is (1,1,0), indicating that the current play environment requires the client-side hardware acceleration, and thus, the system enables the corresponding hardware acceleration, so that the current play environment is capable of supporting the current play mode.

In the present embodiment, if the first declining intersection is searched out and a play mode code satisfying conditions of the first declining intersection belongs to a different play mode group from the play mode code corresponding to the current play mode and the play mode code is unique, a play mode corresponding to the play mode code is marked as the candidate play mode. That is, if the play mode code corresponding to the first declining intersection belongs to a different play mode group from the play mode code corresponding to the current play mode and is unique, the play mode code corresponding to the first declining intersection is taken as the candidate play mode code, and the play mode corresponding to the candidate play mode code is taken as the candidate play mode. For example, in the case that the current play mode belongs to the High-definition compatible mode group and the corresponding reason vector is (1,1,0,0), then a declining intersection of (4, 4,2) may be obtained, the play mode code corresponding to the declining intersection is (4,1,1,1), and it can be obtained, based on the play mode code, that the play mode belongs to the seamless experience mode group. In this case, the acquired candidate play mode belongs to the seamless experience mode group which is different in play mode from the High-definition compatible mode group, therefore, the optimal play mode that can be supported by the current play environment belongs to the seamless experience mode group. At the same time, hardware acceleration corresponding to the candidate play mode is enabled correspondingly. In the present embodiment, if no first declining intersection is searched out and all the elements in the declining intersection are not positive terms, the current play mode is taken as the candidate play mode.

Specifically, the elements refer to the first result, the second result, and the third result in the declining intersection. That is, if none of the first result, the second result and the third result in the declining intersection contains a negative term, the play mode corresponding to the declining intersection containing non-negative values is taken as the candidate play mode. Specifically, the candidate play mode refers to an optimal switchable play mode in the current environment, and the wording "optimal" means that the play mode can be best supported by the current play environment.

In the present embodiment, if the first declining intersection is searched out and a play mode code satisfying conditions of the first declining intersection belongs to a different play mode group from the play mode code corresponding to the current play mode and the play mode code is more than one in number, the candidate play mode is acquired by applying a preset algorithm based on total superiority rate to a mode set corresponding to the first declining intersection.

In the present embodiment, if no first declining intersection is searched out and no element in all the declining intersections contains a positive term, the current play mode is marked as the candidate play mode.

In the present embodiment, if no first declining intersection is searched out and a declining intersection with a positive term on a position corresponding to the reason vector exists in all the declining intersections, the candidate play mode is acquired by applying the preset algorithm based on total superiority rate to a mode set corresponding to all the declining intersections containing a positive term. Specifically, the corresponding position refers to a position of a ranking parameter represented by each of the first result, the second result and the third result in the declining intersection that corresponds to a respective reason parameter in the reason vector. For example, the server-side CPU consumption ranking indicated by the first result in the declining intersection corresponds to sufficiency or insufficiency of the server-side coding capability indicated by the first reason parameter in the reason vector, that is, there are such correspondences between the server side and the server side, between the client side and the client side, and between the bandwidth side and the bandwidth side.

Specifically, the total superiority rate algorithm refers to acquiring the fitness of a certain play mode relative to another play mode in the current play environment. Specifically, a superiority parameter set corresponding to each play mode code is also stored in the dynamic decision table, the superiority parameter set including a first superiority parameter, a second superiority parameter and a third superiority parameter. Particularly, a superiority parameter for a certain resource refers to resource saving superiority that can be obtained by the parameter under a certain algorithm relative to the same parameter under other algorithms during the playing of the streaming media, for quantitatively measuring resource consumption comparison between different streaming media processing modes. Specifically, each of the superiority parameters may be obtained by actual measurement during the playing of a streaming media sample. That is, a certain streaming media sample, a client-side/server-side CPU and a client-side/server-side decoder chip are selected and the streaming media sample is played, and then statistics of the average server-side CPU consumption, the average client-side CPU consumption and the average network bandwidth consumption in each mode during the playing of the streaming media are made and recorded. For example, if the server-side CPU consumption in a certain mode under a test environment is 50%, a superiority parameter for this item in this mode is recorded as 50. If the client-side CPU consumption in a certain mode under a test environment is 50%, a superiority parameter for this item in this mode is recorded as 50. If the network bandwidth consumption in a certain mode under a test environment is 5.2 bps, a superiority parameter for this item in this mode is recorded as 5.2.

Table 9 shows the superiority parameter sets corresponding to several play mode groups.

For example, the play mode code of (1, 1, 0, 0) in the high-definition compatible mode group shown in Table 9 corresponds to the superiority parameter set (A11, B11, C11).

In the present embodiment, a calculation is performed, based on a preset rule, using each of the superiority parameters in the superiority parameter set corresponding to the play mode code corresponding to the current play mode and a corresponding superiority parameter in each of the superiority parameter sets corresponding to play mode codes corresponding to the other play modes in the preset dynamic decision table other than the current play mode, to acquire superiority rates of the play mode codes corresponding to the other play modes.

Specifically, the preset rule means that a first difference between the first superiority parameter in each of the superiority parameter sets corresponding to the play mode codes corresponding to the other play modes other than the current play mode and the first superiority parameter in the superiority parameter set corresponding to the play mode code corresponding to the current play mode is calculated, and then a product of the first difference and a first preset adjustment parameter is taken as a first result. Similarly, a second result and a third result are obtained on the basis of a second adjustment parameter and a third adjustment parameter. Finally, the first result, the second result and the third result are added together to obtain the superiority rate. For example, supposing that the superiority parameter set for mode 1 is (Amn, Bmn, Cmn), and the superiority parameter set for mode 2 is (Alk, Blk, Clk), then the superiority rate of mode 2 relative to mode 1 is $D=\alpha*(Alk-Amn)+\beta*(Blk-Bmn)+\gamma*(Clk-Cmn)$, where a is the first adjustment parameter, $\beta$ is the second adjustment parameter, $\gamma$ is the third adjustment parameter, and in general, $\alpha=1.2$, $\beta=1$ and $\gamma=0.5$.

For example, in the case that the current play mode belongs to the simplified compatible mode group, and the superiority parameter set corresponding to the play mode code in the simplified compatible mode group is (A31, B31, C31), if elements of the declining intersection corresponding to the play mode code (1,1,1,0) in the high-definition compatible mode group and the declining intersection corresponding to the play mode code (2,1,1,0) in the smooth compatible mode group are all positive, the superiority rate of the high-definition compatible mode group relative to the simplified compatible mode group is $D1=\alpha*(A12-A31)+\beta*(B12-B31)+\gamma*(C12-C31)$, and the superiority rate of the

TABLE 9

| Play mode Group Number | Play mode Group | Play mode Code | Mode Requirement Code | Superiority Parameter Set | | |
|---|---|---|---|---|---|---|
| | | | | First Superiority Parameter | Second Superiority Parameter | Third Superiority Parameter |
| 1 | High-definition compatible mode group | (1, 1, 0, 0) (1, 1, 1, 0) | (1, 0, 0) (1, 1, 0) | A11 A12 | B11 B12 | C11 C12 |
| 2 | Smooth compatible mode group | (2, 0, 0, 0) (2, 1, 0, 0) (2, 0, 1, 0) (2, 1, 1, 0) | (0, 0, 0) (1, 0, 0) (0, 1, 0) (1, 1, 0) | A21 A22 A23 A24 | B21 B22 B23 B24 | C21 C22 C23 C24 |
| 3 | Simplified compatible mode group | (3, 0, 0, 0) | (0, 0, 0) | A31 | B31 | C31 |
| 4 | Seamless experience mode group | (4, 0, 1, 1) (4, 1, 1, 1) | (0, 1, 1) (1, 1, 1) | A41 A42 | B41 B42 | C41 C42 | smooth compatible mode group relative to the simplified compatible mode group is $D2=\alpha*(A24-A31)+\beta*(B24-B31)+\gamma*(C24-C31)$.

If values of all the superiority rates are positive values, the positive values of all the superiority rates are compared to acquire a play mode corresponding to the superiority rate having the maximum value, and the play mode is taken as the candidate play mode. For example, if the superiority rate D1 is 5 and the superiority rate D2 is 6, the maximum superiority rate between D1 and D2 is D2, that is, the play mode group corresponding to the play mode code corresponding to D2 is taken as the candidate play mode, in other words, the play mode represented by the play mode group corresponding to D2 is taken as the candidate play mode. If the values of all the superiority rates are negative values, the current play mode is taken as the candidate play mode.

In step S303, it is judged whether the current play mode is the same as the candidate play mode, and a play mode for streaming media to be played is determined according to a result of the judgment.

Figure 3:
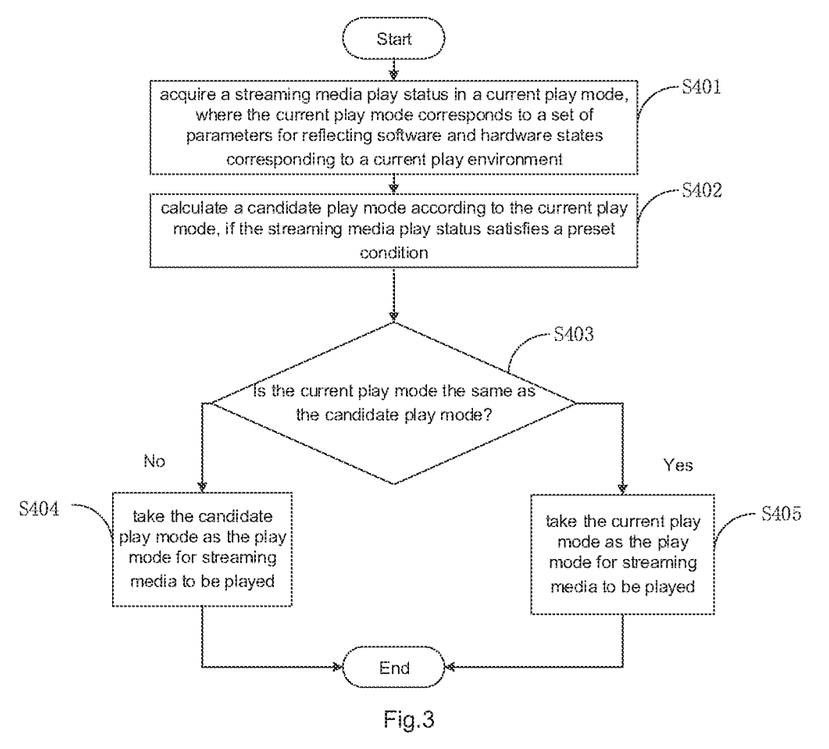
FIG. 3 is a flow chart of a streaming media play mode determination method provided according to a second embodiment of the present invention.

Referring to FIG. 3, a flow chart of a streaming media play mode determination method provided according to a second embodiment of the present invention is shown. The specific procedures shown in FIG. 3 will be described in detail below.

In step S401, a streaming media play status in a current play mode is acquired, where the current play mode corresponds to a set of parameters for reflecting software and hardware states corresponding to a current play environment.

In step S402, a candidate play mode is calculated according to the current play mode, if the streaming media play state satisfies a preset condition.

For the specific implementations of steps S401 and S402, reference may be made to the implementation of corresponding steps in the first embodiment, which will not be repeated here.

In step S403, it is judged whether the current play mode is the same as the candidate play mode.

As a first example, in the present embodiment, if the play mode code corresponding to the current play mode and the play mode code corresponding to the candidate play mode correspond to a same play mode group, it is judged that the current play mode is the same as the candidate play mode. Otherwise, it is judged that the current play mode is different from the candidate play mode.

As a second example, in the present embodiment, if the first result, the second result and the third result in each of the acquired declining intersections are all negative values, it is judged that the current play mode is the same as the candidate play mode. Otherwise, it is judged that the current play mode is different from the candidate play mode.

As a third example, in the present embodiment, if the play mode code corresponding to the candidate play mode acquired on the basis of the preset total superiority rate algorithm and the play mode code corresponding to the current play mode correspond to a same play mode group, it is judged that the current play mode is the same as the candidate play mode. Otherwise, it is judged that the current play mode is different from the candidate play mode.

In step S404, the candidate play mode is taken as the play mode for streaming media to be played, if the current play mode is different from the candidate play mode.

In the present embodiment, if the acquired candidate play mode and the current play mode are different play modes, the candidate play mode is taken as the play mode for the streaming media to be played, and hardware acceleration corresponding to the candidate play mode is enabled.

As an example, if the acquired candidate play mode and the current play mode are different play modes, the candidate play mode is pushed to the user, so as to prompt the user to switch the current play mode to the candidate play mode, and start hardware acceleration corresponding to the candidate play mode. Thus, the user can make the streaming media played in the optimal play mode under the current play environment.

Particularly, it should be noted that the start of the hardware acceleration corresponding to the candidate play mode does not mean that the candidate play mode must support the hardware acceleration. For example, in the case that the candidate play mode belongs to the smooth compatible mode group, since the smooth compatible mode group does not support the hardware acceleration at the server and the client, the hardware acceleration may be enabled for the play mode group, however, just a simple enablement operation is performed in fact.

In step S405, the current play mode is taken as the play mode for the streaming media to be played, if the current play mode is the same as the candidate play mode.

As an example, if the current play mode is the same as the candidate play mode, the current play mode is taken as the play mode for the streaming media to be played, and meanwhile, hardware acceleration corresponding to the current play mode is enabled. That is, it can be obtained that the reason for occurrence of the lag in the current play environment is that the client-side or server-side hardware acceleration is not enabled, and in this case, the system enables the corresponding hardware acceleration.

Figure 4:
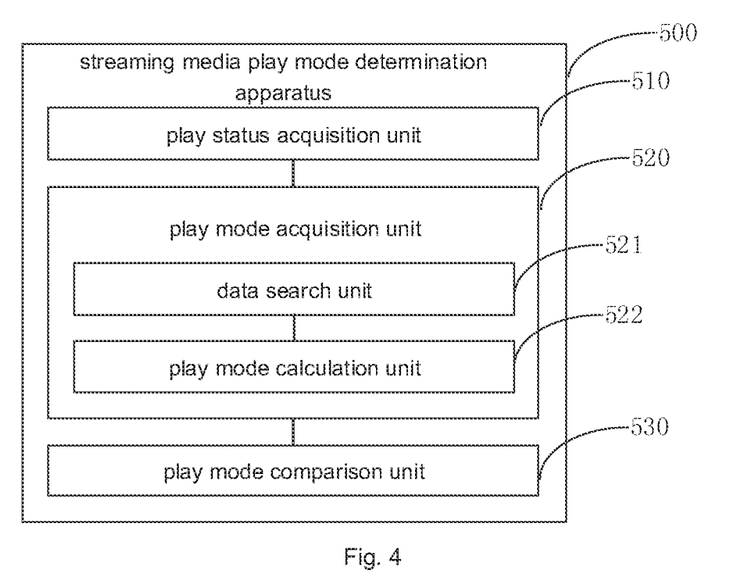
FIG. 4 is a schematic diagram showing functional modules of a streaming media play mode determination apparatus provided according to a third embodiment of the present invention.

Referring to FIG. 4, a schematic diagram showing functional modules of a streaming media play mode determination apparatus provided according to a third embodiment of the present invention is shown. The streaming media play mode determination apparatus 500 includes a play status acquisition unit 510, a play mode acquisition unit 520 and a play mode comparison unit 530.

The play status acquisition unit 510 is configured to acquire a streaming media play status in a current play mode, where the current play mode corresponds to a set of parameters for reflecting software and hardware states corresponding to a current play environment. Specifically, the set of parameters for reflecting the software and hardware states corresponding to the current play environment includes a first parameter for indicating whether server-side hardware acceleration is supported, a second parameter for indicating whether client-side hardware acceleration is supported, and a third parameter for indicating whether player redirection is supported.

The play mode acquisition unit 520 is configured to calculate a candidate play mode according to the current play mode, if the streaming media play status satisfies a preset condition. Specifically, the preset condition includes a condition that the streaming media play status corresponds to a lag and a Boolean value of any one reason parameter in a reason vector corresponding to the lag is 1, the reason vector including a plurality of reason parameters indicated by a Boolean expression.

The play mode acquisition unit 520 further includes a data search unit 521 and a play mode calculation unit 522.

The data search unit 521 is configured to search for, according to the current play mode, a ranking parameter set corresponding to the current play mode in a preset dynamic decision table. The ranking parameter set includes a first ranking parameter for representing server-side CPU consumption, a second ranking parameter for representing client-side CPU consumption and a third ranking parameter for representing network bandwidth consumption.

The play mode calculation unit 522 is configured to perform a calculation using each of the parameters in the ranking parameter set corresponding to the current play mode, and a corresponding parameter in each of ranking parameter sets corresponding to other play modes in the preset dynamic decision table other than the current play mode, to acquire the candidate play mode.

The play mode comparison unit 530 is configured to judge whether the current play mode is the same as the candidate play mode, and determine a play mode for streaming media to be played according to a result of the judgment. Specifically, if the current play mode is the same as the candidate play mode, the current play mode is taken as the play mode for the streaming media to be played, and meanwhile, hardware acceleration corresponding to the current play mode is enabled. If the current play mode is different from the candidate play mode, the candidate play mode is taken as the play mode for the streaming medium to be played, and the hardware acceleration corresponding to the candidate play mode is enabled.

Figure 5:
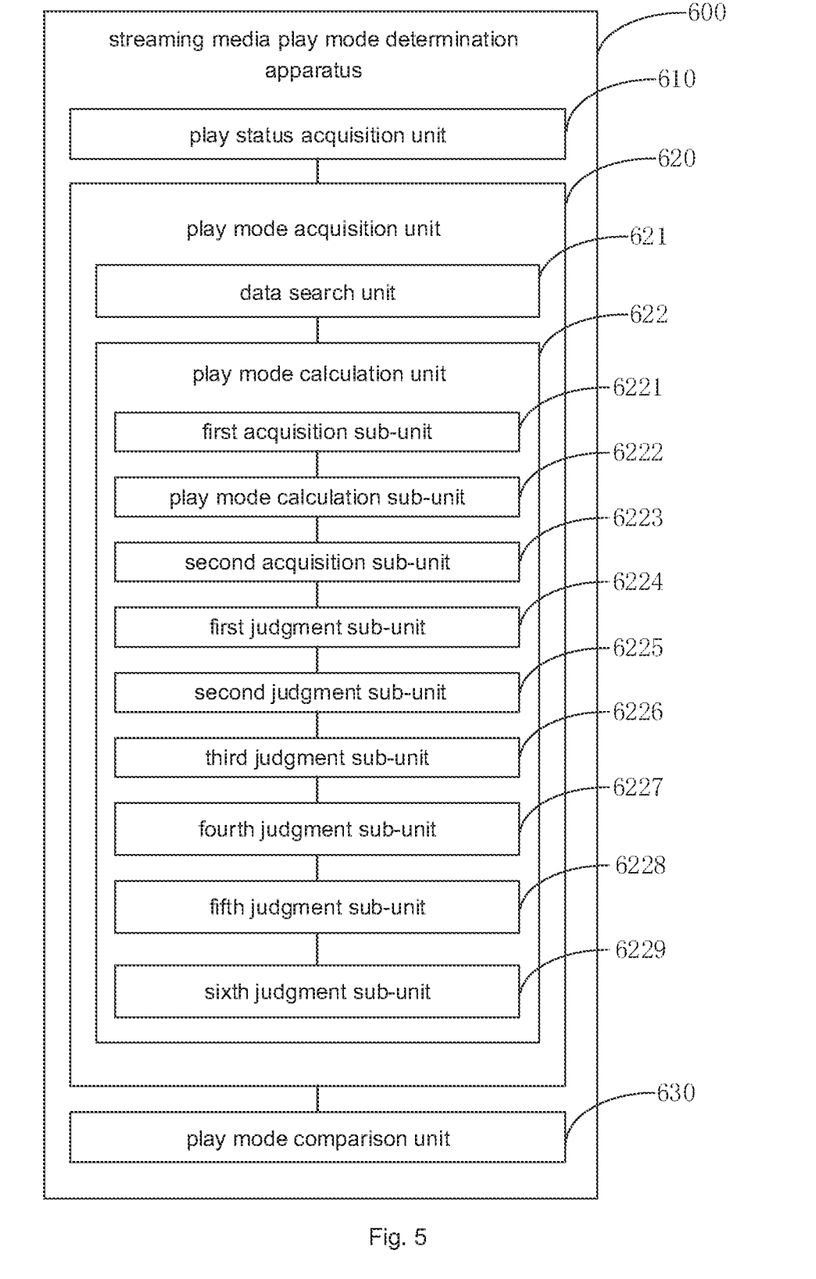
FIG. 5 is a schematic diagram showing functional modules of a streaming media play mode determination apparatus provided according to a fourth embodiment of the present invention.

Referring to FIG. 5, a schematic diagram showing functional modules of a streaming media play mode determination apparatus provided according to a fourth embodiment of the present invention is shown. The streaming media play mode determination apparatus 600 includes a play status acquisition unit 610, a play mode acquisition unit 620 and a play mode comparison unit 630.

The play status acquisition unit 610 is configured to acquire a streaming media play status in a current play mode, where the current play mode corresponds to a set of parameters for reflecting software and hardware states corresponding to a current play environment.

The play mode acquisition unit 620 is configured to calculate a candidate play mode according to the current play mode, if the streaming media play status satisfies a preset condition.

The play mode acquisition unit 620 further includes a data search unit 621 and a play mode calculation unit 622.

The data search unit 621 is configured to search for, according to the current play mode, a ranking parameter set corresponding to the current play mode in a preset dynamic decision table. The ranking parameter set includes a first ranking parameter for representing server-side CPU consumption, a second ranking parameter for representing client-side CPU consumption and a third ranking parameter for representing network bandwidth consumption.

The play mode calculation unit 622 is configured to perform a calculation using each of the parameters in the ranking parameter set corresponding to the current play mode, and a corresponding parameter in each of ranking parameter sets corresponding to other play modes in the preset dynamic decision table other than the current play mode, to acquire the candidate play mode.

The play mode calculation unit 622 further includes a first acquisition sub-unit 6221, a play mode calculation sub-unit 6222, a second acquisition sub-unit 6223, a first judgment sub-unit 6224, a second judgment sub-unit 6225, a third judgment sub-unit 6226, a fourth judgment sub-unit 6227, a fifth judgment sub-unit 6228 and a sixth judgment sub-unit 6229.

The first acquisition sub-unit 6221 is configured to acquire a play mode code corresponding to the current play mode, where the play mode code includes the set of parameters for reflecting the software and hardware states corresponding to the current play environment.

The play mode calculation sub-unit 6222 is configured to subtract each of the parameters in the ranking parameter set corresponding to the current play mode from a corresponding parameter in each of ranking parameter sets corresponding to other play modes in the preset dynamic decision table other than the current play mode, so as to obtain a declining intersection corresponding to each of the other play mode codes, where the declining intersection includes a first result, a second result and a third result.

The second acquisition sub-unit 6223 is configured to acquire a corresponding reason vector when a lag occurs in the current play mode, where the reason vector includes one integer for representing a play mode group number and a plurality of reason parameters indicated by a Boolean expression, and the reason parameters include a first reason parameter for indicating whether server-side coding capability is sufficient, a second reason parameter for indicating whether client-side decoding capability is sufficient, and a third reason parameter for indicating whether bandwidth is sufficient.

The first judgment sub-unit 6224 is configured to compare each of the reason parameters in the reason vector with one corresponding result of the individual results in the declining intersection, to search for all first declining intersections from the declining intersections, where the result on a position, that corresponds to a reason parameter of 0 in the reason vector, in each of the first declining intersections is non-negative and the result on a position, that corresponds to a reason parameter of 1 in the reason vector, in the first declining intersection is positive.

The second judgment sub-unit 6225 is configured to mark, if the first declining intersection is searched out and a play mode code set corresponding to the first declining intersection contains a play mode code which belongs to a same play mode group as the play mode code corresponding to the current play mode, the current play mode as the candidate play mode.

The third judgment sub-unit 6226 is configured to mark, if the first declining intersection is searched out and a play mode code satisfying conditions of the first declining intersection belongs to a different play mode group from the play mode code corresponding to the current play mode and the play mode code is unique, a play mode corresponding to the play mode code as the candidate play mode.

The fourth judgment sub-unit 6227 is configured to acquire, if the first declining intersection is searched out and a play mode code satisfying conditions of the first declining intersection belongs to a different play mode group from the play mode code corresponding to the current play mode and the play mode code is more than one in number, the candidate play mode by applying a preset algorithm based on total superiority rate to a mode set corresponding to the first declining intersection.

The fifth judgment sub-unit 6228 is configured to mark, if no first declining intersection is searched out and no element in all the declining intersections contains a positive term, the current play mode as the candidate play mode.

The sixth judgment sub-unit 6229 is configured to acquire, if no first declining intersection is searched out and a declining intersection with a positive term on a position corresponding to the reason vector exists in all the declining intersections, the candidate play mode by applying the preset algorithm based on total superiority rate to a mode set corresponding to all the declining intersections containing a positive term.

The play mode comparison unit 630 is configured to judge whether the current play mode is the same as the candidate play mode, and determine a play mode for streaming media to be played according to a result of the judgment. Specifically, if the current play mode is the same as the candidate play mode, the current play mode is taken as the play mode for the streaming media to be played, and meanwhile, all the hardware acceleration corresponding to the current play mode is enabled. If the current play mode is different from the candidate play mode, the candidate play mode is taken as the play mode for the streaming medium to be played, and the hardware acceleration corresponding to the candidate play mode is enabled.

It should be noted that, in the present embodiment, each play mode group corresponds to one streaming media processing algorithm.

As described above, embodiments of the present invention provide a streaming media play mode determination method and apparatus. In the present application, the streaming media play status in the current play mode is acquired; it is determined whether the streaming media play status in the current play mode matches the preset condition, and if yes, the candidate play mode is calculated according to the current play mode; and the candidate play mode is compared with the current play mode, to judge whether the current play mode is the same as the candidate play mode. In this way, the best play mode supported by the current play environment can be obtained in a real time manner, during the playing of the streaming media. Moreover, a perfect model is established by the deep analysis of various streaming media redirection algorithms in cooperation with the actual software and hardware usage environment of the streaming media, making it possible to calculate the matching degrees of various types of streaming media processing algorithms in the current environment, and thus enabling the best play mode to be preferentially selected.

In several embodiments provided in the present application, it should be understood that the disclosed apparatus and method may also be implemented in other ways. The embodiments of the apparatus described above are merely illustrative, for example, the flow charts and block diagrams in the Figures illustrate implementable architectures, functionalities, and operations of apparatuses, methods and computer program products according to various embodiments of the present invention. In this regard, each block in the flow charts or block diagrams may represent a module, a program segment, or a portion of code, which includes one or more executable instructions for implementing specified logical function(s). It should also be noted that, in some alternative implementations, the functions shown in the blocks may occur out of the order shown in the figures. For example, two blocks shown in succession may, in fact, be executed substantially in parallel, or they may sometimes be executed in a reverse order, depending upon the functionality involved. It will also be noted that each block of the block diagrams and/or flow charts, and combinations of blocks in the block diagrams and/or flow charts, may be implemented by special purpose hardware-based systems that perform the specified functions or actions, or by a combination of special purpose hardware and computer instructions.

In addition, the individual functional modules in the various embodiments of the present invention may be integrated together to form one independent part, or each module may exist on its own, or two or more modules may be integrated to form one independent part.

When implemented in the form of a software functional module and sold or used as an independent product, the functions may be stored in one computer-readable storage medium. Based on such understanding, the technical solutions of the present invention essentially, or the part contributing to the prior art, or a part of the technical solutions may be embodied in the form of a software product. The computer software product is stored in a storage medium, and includes a number of instructions for causing a computer device (which may be a personal computer, a server, a network device or the like) to execute all or some of the steps of the methods described in the various embodiments of the present invention. The preceding storage medium includes any medium that can store program codes, such as a USB flash disk, a mobile hard disk, a read-only memory (ROM), a random access memory (RAM), a magnetic disk, or an optical disk. It should be noted that relational terms, such as "first" and "second", used herein may be used solely to distinguish one entity or action from another one, without necessarily requiring or implying that such a relationship or order really exists between these entities or actions. Moreover, the terms "comprises," "comprising," or any other variation thereof, are intended to cover a non-exclusive inclusion, such that a process, method, article, or device that comprises a series of elements does include not only those elements but also other elements not expressly listed, or further include elements inherent to such process, method, article, or device. An element defined by the phrase "comprising a/an . . . " does not preclude, without further constraints, the existence of additional identical elements in the process, method, article, or apparatus that comprises the element.

The above description is merely illustrative of preferred embodiments of the present invention, and is not intended to limit the present invention. It would be understood by those skilled in the art that various modifications and variations can be made to the present invention. Any modifications, equivalent alternatives, improvements and so on, made within the spirit and principle of the present invention, should all be embraced in the scope of protection of the present invention. It should be noted that similar reference numerals and letters refer to similar items in the following figures. Thus, once an item is defined in one figure, it may not be further defined or explained in the following figures.

The invention claimed is:

1. A streaming media play mode determination method, comprising:
   acquiring a streaming media play status in a current play mode, wherein the current play mode corresponds to a set of parameters for reflecting software and hardware states corresponding to a current play environment;
   calculating a candidate play mode according to the current play mode, if the streaming media play status satisfies a preset condition; and
   judging whether the current play mode is the same as the candidate play mode, and determining a play mode for streaming media to be played according to a result of the judgment;
   wherein the step of calculating a candidate play mode according to the current play mode comprises:
      searching for, according to the current play mode, a ranking parameter set corresponding to the current play mode in a preset dynamic decision table, wherein the ranking parameter set comprises a first ranking parameter for representing server-side CPU consumption, a second ranking parameter for representing client-side CPU consumption, and a third ranking parameter for representing network bandwidth consumption; and performing a calculation using each of the parameters in the ranking parameter set corresponding to the current play mode, and a corresponding parameter in each of ranking parameter sets corresponding to other play modes in the preset dynamic decision table other than the current play mode, to acquire a candidate play mode;

wherein the step of performing a calculation using each of the parameters in the ranking parameter set corresponding to the current play mode and a corresponding parameter in each of ranking parameter sets corresponding to other play modes in the preset dynamic decision table other than the current play mode, to acquire a candidate play mode comprises:

acquiring a play mode code corresponding to the current play mode, wherein the play mode code comprises the set of parameters for reflecting the software and hardware states corresponding to the current play environment;

subtracting each of the parameters in the ranking parameter set corresponding to the play mode code corresponding to the current play mode from a corresponding parameter in each of ranking parameter sets corresponding to play mode codes corresponding to other play modes in the preset dynamic decision table other than the current play mode, to obtain a declining intersection corresponding to each of the other play mode codes, wherein the declining intersection comprises a first result, a second result, and a third result;

acquiring a corresponding reason vector when a lag occurs in the current play mode, wherein the reason vector comprises one integer for representing a play mode group number and a plurality of reason parameters indicated by a Boolean expression, and the reason parameters comprise a first reason parameter for indicating whether server-side coding capability is sufficient, a second reason parameter for indicating whether client-side decoding capability is sufficient, and a third reason parameter for indicating whether bandwidth is sufficient;

comparing each of the reason parameters in the reason vector with one corresponding result of the individual results in the declining intersection, to search for all first declining intersections from the declining intersections, wherein the result on a position, that corresponds to a reason parameter of 0 in the reason vector, in each of the first declining intersections is non-negative and the result on a position, that corresponds to a reason parameter of 1 in the reason vector, in the first declining intersection is positive;

marking, if the first declining intersection is searched out and a play mode code set corresponding to the first declining intersection contains a play mode code which belongs to a same play mode group as the play mode code corresponding to the current play mode, the current play mode as the candidate play mode;

marking, if the first declining intersection is searched out and a play mode code satisfying conditions of the first declining intersection belongs to a different play mode group from the play mode code corresponding to the current play mode and the play mode code is unique, a play mode corresponding to the play mode code as the candidate play mode;

acquiring, if the first declining intersection is searched out and a play mode code satisfying conditions of the first declining intersection belongs to a different play mode group from the play mode code corresponding to the current play mode and the play mode code is more than one in number, the candidate play mode by applying a preset algorithm based on total superiority rate to a mode set corresponding to the first declining intersection;

marking, if no first declining intersection is searched out and no element in all the declining intersections contains a positive term, the current play mode as the candidate play mode; and acquiring, if no first declining intersection is searched out and a declining intersection with a positive term on a position corresponding to the reason vector exists in all the declining intersections, the candidate play mode by applying the preset algorithm based on total superiority rate to a mode set corresponding to all the declining intersections containing a positive term.

2. The method according to claim 1, wherein the set of parameters for reflecting the software and hardware states corresponding to the current play environment comprises a first parameter for indicating whether server-side hardware acceleration is supported, a second parameter for indicating whether client-side hardware acceleration is supported, and a third parameter for indicating whether player redirection is supported.

3. The method according to claim 1, wherein the preset condition comprises a condition that the streaming media play status corresponds to a lag and a Boolean value of any one reason parameter in a reason vector corresponding to the lag is 1, the reason vector comprising a plurality of reason parameters indicated by a Boolean expression.

4. The method according to claim 1, wherein the step of acquiring the candidate play mode by applying the preset algorithm based on total superiority rate comprises:

acquiring a superiority parameter set corresponding to each preselected play mode code, wherein the superiority parameter set comprises a first superiority parameter, a second superiority parameter and a third superiority parameter;

performing a calculation, based on a preset rule, using each of superiority parameters in a superiority parameter set corresponding to the play mode code corresponding to the current play mode and a corresponding superiority parameter in each of the superiority parameter sets corresponding to the play mode codes corresponding to the other play modes in the preset dynamic decision table other than the current play mode, to acquire superiority rates of the play mode codes corresponding to the other play modes;

sequencing values of all the superiority rates, and taking as the candidate play mode a play mode corresponding to a play mode code corresponding to the superiority rate having the maximum value, if the values of all the superiority rates are positive values; and taking the current play mode as the candidate play mode, if the values of all the superiority rates are non-positive.

5. The method according to claim 1, wherein the step of judging whether the current play mode is the same as the candidate play mode and determining a play mode for streaming media to be played according to a result of the judgment comprises:

taking the current play mode as a play mode for the streaming media to be played, and meanwhile, enabling all hardware acceleration corresponding to the current play mode, if the current play mode is the same as the candidate play mode; or taking the candidate play mode as a play mode for the streaming medium to be played, and enabling hardware acceleration corresponding to the candidate play mode, if the current play mode is different from the candidate play mode.

6. A streaming media play mode determination apparatus, comprising:

a memory; and at least one processor coupled to the memory storing instructions, that when executed by the at least one processor, causes the at least one processor to:

acquire a streaming media play status in a current play mode, wherein the current play mode corresponds to a set of parameters for reflecting software and hardware states corresponding to a current play environment;

calculate a candidate play mode according to the current play mode, if the streaming media play status satisfies a preset condition; and judge whether the current play mode is the same as the candidate play mode, and determine a play mode for streaming media to be played according to a result of the judgment;

wherein the at least one processor is further configured to:

search for, according to the current play mode, a ranking parameter set corresponding to the current play mode in a preset dynamic decision table, wherein the ranking parameter set comprises a first ranking parameter for representing server-side CPU consumption, a second ranking parameter for representing client-side CPU consumption, and a third ranking parameter for representing network bandwidth consumption; and perform a calculation using each of the parameters in the ranking parameter set corresponding to the current play mode and a corresponding parameter in each of ranking parameter sets corresponding to other play modes in the preset dynamic decision table other than the current play mode, to acquire the candidate play mode;

acquire a play mode code corresponding to the current play mode, wherein the play mode code comprises the set of parameters for reflecting the software and hardware states corresponding to the current play environment;

subtract each of the parameters in the ranking parameter set corresponding to the play mode code corresponding to the current play mode from a corresponding parameter in each of ranking parameter sets corresponding to play mode codes corresponding to other play modes in the preset dynamic decision table other than the currently play mode, to obtain a declining intersection corresponding to each of the other play mode codes, wherein the declining intersection comprises a first result, a second, result, and a third result;

acquire a corresponding reason vector when a lag occurs in the current play mode, wherein the reason vector comprises one integer for representing a play mode group number and a plurality of reason parameters indicated by a Boolean expression, and the reason parameters comprise a first reason parameter for indicating whether server-side coding capability is sufficient, a second reason parameter for indicating whether client-side decoding capability is sufficient, and a third reason parameter for indicating whether bandwidth is sufficient;

compare each of the reason parameters in the reason vector with one corresponding result of the individual results in the declining intersection, to search for all first declining intersections from the declining intersections, wherein the result on a position, that corresponds to a reason parameter of 0 in the reason vector, in each of the first declining intersections is non-negative and the result on a position, that corresponds to a reason parameter of 1 in the reason vector, in the first declining intersection is positive;

mark, if the first declining intersection is searched out and a play mode code set corresponding to the first declining intersection contains a play mode code which belongs to a same play mode group as the play mode code corresponding to the currently play mode, the currently play mode as the candidate play mode;

mark, if the first declining intersection is searched out and a play mode code satisfying conditions of the first declining intersection belongs to a different play mode group from the play mode code corresponding to the current play mode and the play mode code is unique, a play mode corresponding to the play mode code as the candidate play mode;

acquire, if the first declining intersection is searched out and a play mode code satisfying conditions of the first declining intersection belongs to a different play mode group from the play mode code corresponding to the current play mode and the play mode code is more than one in number, the candidate play mode by applying a preset algorithm based on total superiority rate to a mode set corresponding to the first declining intersection;

mark, if no first declining intersection is searched out and no element in all the declining intersections contains a positive term, the current play mode as the candidate play mode; and acquire, if no first declining intersection is searched out and a declining intersection with a positive term on a position corresponding to the reason vector exists in all the declining intersections, the candidate play mode by applying the preset algorithm based on total superiority rate to a mode set corresponding to all the declining intersections containing a positive term.

* * * * *